(12) United States Patent
Zhang et al.

(10) Patent No.: US 12,548,853 B2
(45) Date of Patent: Feb. 10, 2026

(54) INTERFACE FUNCTIONAL LAYER AND PREPARATION METHOD THEREOF, AND LITHIUM-ION BATTERY

(71) Applicant: Zhuhai CosMX Battery Co., Ltd., Zhuhai (CN)

(72) Inventors: Zhaoshuai Zhang, Zhuhai (CN); Wei Zhao, Zhuhai (CN); Suli Li, Zhuhai (CN); Junyi Li, Zhuhai (CN); Yanming Xu, Zhuhai (CN)

(73) Assignee: Zhuhai CosMX Battery Co., Ltd., Zhuhai (CN)

( * ) Notice: Subject to any disclaimer, the term of this patent is extended or adjusted under 35 U.S.C. 154(b) by 540 days.

(21) Appl. No.: 18/148,975

(22) Filed: Dec. 30, 2022

(65) Prior Publication Data
US 2023/0163421 A1  May 25, 2023

Related U.S. Application Data

(63) Continuation of application No. PCT/CN2021/114119, filed on Aug. 23, 2021.

(30) Foreign Application Priority Data

Aug. 31, 2020  (CN) .......................... 202010897495.8

(51) Int. Cl.
*H01M 50/48* (2021.01)
*H01M 10/0525* (2010.01)

(52) U.S. Cl.
CPC ....... *H01M 50/48* (2021.01); *H01M 10/0525* (2013.01)

(58) Field of Classification Search
CPC .. H01M 50/48; H01M 10/0525; H01M 4/134; H01M 4/366; H01M 4/382;
(Continued)

(56) References Cited

U.S. PATENT DOCUMENTS

2010/0248026 A1* 9/2010 Hinoki ................... H01M 50/46
429/209
2017/0317352 A1* 11/2017 Lee ..................... H01M 10/0569
(Continued)

FOREIGN PATENT DOCUMENTS

CN  107394115 A  11/2017
CN  107834104 A   3/2018
(Continued)

OTHER PUBLICATIONS

International Search Report and Written Opinion dated Oct. 27, 2021 for International Application No. PCT/CN2021/114119.

*Primary Examiner* — Daniel S Gatewood (57) ABSTRACT

This application relates to an interface functional layer and a preparation method thereof, and a lithium-ion battery, where the interface functional layer includes a cyclic ether compound, a lithium salt, an auxiliary agent and a ceramic powder in a mass ratio of 50-90:5-30:5-40:0-5. In this application, the interface functional layer is provided between a positive and/or negative electrode and a solid electrolyte, thereby inhibiting the uneven deposition of lithium-ions at interfacial gaps, reducing the interface impedance, and meanwhile improving the interfacial stability.

5 Claims, 3 Drawing Sheets (58) Field of Classification Search
CPC .. H01M 4/628; H01M 10/052; H01M 10/058; Y02E 60/10; Y02P 70/50
See application file for complete search history.

(56) References Cited

U.S. PATENT DOCUMENTS

2020/0099090 A1    3/2020  Li et al.
2020/0099097 A1*   3/2020  Li .......................... H01G 11/60

FOREIGN PATENT DOCUMENTS

| | | |
|---|---|---|
| CN | 108832131 A | 11/2018 |
| CN | 108832174 A | 11/2018 |
| CN | 109786675 A | 5/2019 |
| CN | 110212160 A | 9/2019 |
| CN | 111052478 A | 4/2020 |
| CN | 111293287 A | 6/2020 |
| CN | 111326786 A | 6/2020 |
| CN | 111463478 A | 7/2020 |
| CN | 111834662 A | 10/2020 |
| JP | 2014194871 A | 10/2014 |
| WO | 2013060669 A1 | 5/2013 |
| WO | 2018233413 A1 | 12/2018 |
| WO | 2020143259 A1 | 7/2020 |

* cited by examiner

INTERFACE FUNCTIONAL LAYER AND PREPARATION METHOD THEREOF, AND LITHIUM-ION BATTERY

This application is a continuation of International Application No. PCT/CN2021/114119, filed on Aug. 23, 2021, which claims priority to Chinese patent application No. 202010897495.8, entitled "Interface Functional Layer and Preparation Method Thereof, and Lithium-ion Battery" and filed with the China National Intellectual Property Administration (CNIPA) on Aug. 31, 2020, both of which are hereby incorporated by reference in their entireties.

TECHNICAL FIELD

The application belongs to a technical field of lithium-ion batteries, and in particular relates to an interface functional layer and a preparation method thereof, and a lithium-ion battery.

BACKGROUND

In recent years, among various commercial chargeable/dischargeable chemical energy storage devices, lithium-ion batteries have the characteristics of high energy density and long service life and have been attracting attention since they were put into the market, and are widely used in mobile phones, laptops, electric vehicles and other fields. However, since organic electrolytes are flammable and explosive, and also volatile, it is easy to cause safety problems in lithium-ion batteries. Therefore, solid electrolytes are used to replace liquid electrolytes by researchers in order to fundamentally solve the safety problems of all-solid-state batteries. As a key material of all-solid-state lithium batteries, solid electrolytes can effectively improve the safety and stability of batteries due to their high mechanical strength, excellent density and ability to resist a growth of lithium dendrites.

Although traditional solid electrolytes have certain advantages in ionic conductivity, the interface between the solid electrolyte and electrodes has always been an important challenge limiting the development of solid-state batteries. For example, generally, there exist a space charge layer and defect structures at the solid-solid interface, whose physicochemical properties may affect the transport of ions and electrons, the stability of the electrode structure, and the rate of charge transfer. A CEI (cathode electrolyte interface) film on the positive electrode surface and an SEI (solid electrolyte interface) film on the negative electrode surface each have a certain influence on the cycle and capacity during the cycle of batteries; a poor contact wettability of the solid-solid interface between the positive electrode and the electrolyte easily leads to increased interfacial resistance of the electrolyte. A metal lithium of the negative electrode is active, and the interface problem due to poor contact may lead to uneven deposition of lithium dendrites at the interface, and the continuous growth of lithium dendrites causes short circuit in the battery, which has a very big potential safety hazard.

Therefore, it is necessary to develop an interfacial functional layer that can stabilize the solid electrolyte and lithium negative electrode.

SUMMARY

This application provides an interface functional layer. The interface functional layer is disposed between a positive and/or negative electrode and a solid electrolyte, such that an uneven deposition of lithium-ions at interface gaps is suppressed, interface impedance is reduced, and meanwhile interface stability is improved.

This application further provides a preparation method of the above-mentioned interface functional layer, which has the advantages of simple process, convenient operation, remarkable effect and convenience for industrial production.

This application further provides a lithium-ion battery with higher cycle efficiency and cycle stability, and a short circuit rate being almost zero.

The technical solution proposed in this application is provided below.

In a first aspect of this application, there is provided an interface functional layer, where the interface functional layer includes a cyclic ether compound, a lithium salt, an auxiliary agent and a ceramic powder in a mass ratio of (50-90):(5-30):(5-40):(0-5).

By adjusting a composition and ratio of raw materials in the interface functional layer of this application, grain boundary resistance and electrode interface performance can be improved, and the uneven deposition of lithium-ions at interface gaps can be inhibited, and the interface impedance can be induced, and meanwhile the interface stability can be improved.

The above-mentioned interface functional layer of this application may further have the following additional technical features.

In a specific embodiment of this application, the interface functional layer is obtained by fully mixing the raw materials to obtain a mixed solution, and then attaching the mixed solution to the positive electrode, the negative electrode and/or the solid electrolyte, and performing a curing treatment.

Specifically, the attaching method is selected from one or more of blade coating, spray coating, tape casting and soaking.

The temperature of the curing treatment may be adjusted according to the raw materials of the interface functional layer. Generally, the temperature of the curing treatment may be adjusted to 25-60° C., such as 35° C., thereby obtaining a uniform and stable interface functional layer.

A thickness of the interface functional layer is controlled within a certain range, which is beneficial to better control ion-passing rate and electrical conductivity. In this application, a thickness of the interface functional layer is about 10 nm-10 μm, for example, 100 nm-1 μm, and further, the thickness of the interface functional layer is 400 nm -800 nm.

The cyclic ether compound, the lithium salt, the auxiliary agent and the ceramic powder in this application are all conventional materials in this field, and may also be self-made or commercially available, which are not particularly limited in this application.

Nano-scale ceramic powder is used, which is more conducive to obtaining an interface functional layer with better electrical properties. Therefore, in this application, a particle size of the ceramic powder is about 1-900 nm, for example, 400-800 nm, and further, the particle size of the ceramic powder is 500-600 nm.

In a specific embodiment of this application, the cyclic ether compound is selected from 1,3-dioxolane and/or 1,4-dioxane; and/or, the lithium salt is selected from one or more of lithium perchlorate, lithium hexafluorophosphate, lithium hexafluoroarsenate, lithium tetrafluoroborate, lithium bis(oxalate) borate, lithium difluoro(oxalate) borate, lithium bis(difluorosulfonyl)imide, lithium bis(trifluoromethanesulfonyl)imide, lithium trifluoromethanesulfonate, lithium bis(malonato) borate, lithium malonate(oxalate) borate, lithium hexafluoroantimonate, lithium difluorophosphate, lithium 4,5-dicyano-2-trifluoromethyl imidazole, $LiN(SO_2CF_3)_2$, $LiN(SO_2C_2F_5)_2$, $LiC(SO_2CF_3)_3$ and $LiN(SO_2F)_2$; and/or, the auxiliary agent is selected from one or more of ethylene glycol dimethyl ether, dipropylene glycol dimethyl ether, ethylene carbonate, propylene carbonate, dimethyl carbonate and diethyl carbonate; and/or, the ceramic powder is made of a material selected from one or more of nano-hexagonal boron nitride, nano-alumina and nano-silicon dioxide.

In a second aspect of this application, there is provided a preparation method of the above-mentioned interface functional layer, including the following steps.

An interface functional layer is obtained by fully mixing a cyclic ether compound, a lithium salt, an auxiliary agent and a ceramic powder in a mass ratio of (50-90):(5-30):(5-40):(0-5), and then attaching to a positive electrode, a negative electrode and/or a solid electrolyte, and performing a curing treatment. Those skilled in the art, may understand that during mixing, auxiliary stirring may be used to speed up the mixing, for example, adjusting a rotating speed to 200-1000 rpm/min and stirring for 1-24 hours, to obtain a uniformly mixed solution. The cyclic ether compound, lithium salt and auxiliary agent may be mixed firstly to be uniform, and then the ceramic powder is slowly added to facilitate the dispersion of the ceramic powder.

Type of the negative electrode is not limited in this application. The negative electrode is selected from at least one of a metal lithium negative electrode or a lithium alloy negative electrode, where the metal lithium is selected from one of molten metal lithium, lithium powder and lithium ribbon, and the lithium alloy is selected from one of Li—In alloy, Li—Al alloy, Li—Sn alloy, Li—Mg alloy and Li—Ge alloy.

In a specific embodiment of this application, the attaching method is selected from one or more of blade coating, spray coating, tape casting and soaking. Specifically, the temperature of the curing treatment is 25-60° C., for example, 35° C., and the interface functional layer after curing has a uniform and good morphology and few pores and cracks.

The above-mentioned preparation method of the interface functional layer of this application has the advantages of simple process, convenient operation, remarkable effect and convenience for industrial production. The interface functional layer is provided between a positive and/or negative electrode and a solid electrolyte, such that the uneven deposition of lithium-ions at interfacial gaps is inhibited, and the interface impedance is reduced, and meanwhile the interface stability is improved.

In a third aspect of this application, there is provided a lithium-ion battery, which is prepared by winding or laminating a positive electrode, a solid electrolyte, and a negative electrode, and the above-mentioned interface functional layer is further provided between the negative electrode and the solid electrolyte and/or between the positive electrode and the solid electrolyte.

The lithium-ion battery can be prepared by a conventional winding or lamination process. Specifically, the positive electrode sheet, the solid electrolyte, the interface functional layer, and the negative electrode sheet are wound or laminated together in sequence, and then vacuum-packed, followed by welding tabs to obtain the lithium-ion battery.

The composition of the positive electrode sheet may include a positive electrode active material, a solid electrolyte, a conductive agent and a binder in a mass ratio of (70-95):(1-15):(1-10):(1-10).

The composition of the positive electrode sheet includes a positive electrode material, a conductive agent and a binder. The active material in the positive electrode material may be selected from one or more of the group consisting of lithium iron phosphate chemical system material, lithium cobalt oxide chemical system material, lithium nickel cobalt manganate chemical system material, lithium manganate chemical system material, lithium nickel cobalt aluminate chemical system material, lithium nickel cobalt manganese aluminate chemical system, nickel cobalt aluminum tungsten chemical system material, lithium-rich manganese chemical system material, lithium nickel cobalt oxide chemical system material, lithium nickel titanium magnesium oxide chemical system material, lithium nickel oxide chemical system material, spinel lithium manganese oxide chemical system material and nickel cobalt tungsten chemical system material.

The conductive agent may be selected from one or more of conductive carbon black SP, ketjen black, acetylene black, carbon nanotube (CNT), graphene and flake graphite.

The binder may be selected from one or more of polytetrafluoroethylene, polyvinylidene fluoride and polyvinylidene fluoride-hexafluoropropylene.

The electrolyte may be a solid electrolyte or a liquid electrolyte.

The liquid electrolyte may be self-made or any commercial electrolyte purchased from the market.

The electrolyte may be selected from one or more of sulfide electrolyte, perovskite-type electrolyte, Garnet-type electrolyte, NASICON-type electrolyte, LISICON-type electrolyte, and polymer electrolyte.

The sulfide electrolyte may be selected from one or more of lithium phosphorus chlorine sulfide, lithium phosphorus bromine sulfide, lithium phosphorus iodine sulfide, lithium phosphorus silicon sulfide, lithium phosphorus aluminum sulfide, lithium phosphorus germanium sulfide, lithium phosphorus boron sulfide, lithium phosphorus sulfide, lithium silicon sulfide, lithium silicon indium sulfide and the like.

The perovskite-type electrolyte is $Li_3xLa_{2/3-x}TiO_3$, in which $0.04<x<0.17$.

The Garnet-type electrolyte is a lithium-lanthanum-zirconium-oxide electrolyte and its derivatives doped with Al, Ga, Fe, Ge, Ca, Ba, Sr, Y, Nb, Ta, W, or Sb element; further, the Garnet-type electrolyte is $Li_{7-n}La_3Zr_{2-n}Ta_nO_{12}$ and/or $Li_{7-n}La_3Zr_{2-n}Nb_nO_{12}$, where $0 \leqslant n \leqslant 0.6$; or $Li_{6.4-x}La_3Zr_{2-x}Ta_xAl_{0.2}O_{12}$, where $0.2 \leqslant x \leqslant 0.5$.

The NASICON-type electrolyte is $Li_{1+x}Al_xTi_{2-x}(PO_4)_3$ (LATP), where $0.2 \leqslant x \leqslant 0.5$; and/or $Li_{1+x}Al_xGe_{2-x}(PO_4)_3$ (LAGP), where $0.4 \leqslant x \leqslant 0.5$.

The LISICON-type electrolyte is $Li_{4-x}Ge_{1-x}P_xS_4$ (X=0.4 or X=0.6).

The polymer electrolyte is selected from polymer electrolytes containing lithium salts, where, the polymer is selected from polycarbonate, polyether, polyethylene glycol, polyphenylene ether, polyethylene diamine, polyethylene dithiol, polyester, polyethylene oxide, etc. and their copolymer derivatives.

The lithium-ion battery of this application may be a button cell, a mould battery or a soft-packed battery.

In the lithium-ion battery of this application, an interface functional layer is provided between the positive and/or negative electrode and the solid electrolyte, thereby suppressing the uneven deposition of lithium-ions at the interface gaps, reducing the interface impedance, and simultaneously improving the interface stability. The lithium-ion battery of this application has higher cycle efficiency and cycle stability, while the short-circuit rate of the battery is almost zero.

Additional aspects and advantages of this application will be set forth partly in the following description, and will partly become apparent from the following description, or may be learned by practice of this application.

DESCRIPTION OF EMBODIMENTS

This application will be described in further detail below with reference to specific embodiments. It should be understood that the following examples are only to exemplarily illustrate and explain this application, and should not be construed as limiting a protection scope of this application. All technologies implemented based on the above contents of this application are covered within the protection scope intended by this application.

The ceramic powders in the examples of this application were purchased from Kejing Chemical Co., Ltd., with a particle size of about 400-800 nm.

This application is described in detail below by specific examples.

The test methods for each example and comparative example are as follows.

1. AC Impedance at Room Temperature

AC impedance test for lithium-ion batteries

The electrochemical workstation with a model CHI600E from Shanghai Chenhua Instrument Co, Ltd. was used for battery testing, with a parameter setting: an amplitude of 10 mV, a frequency range of 0.1 Hz-3 MHz.

2. Cycle Test for Symmetric Lithium Batteries

Battery test equipment from Wuhan Landian Electronics Co. Ltd was used.

Test conditions: a constant current charge-discharge test for symmetric lithium batteries was carried out at a current density of 1 mA/cm$^2$.

3. Cycle Life Test

The test instrument adopted was the battery test equipment from Wuhan Landian Electronics Co. Ltd.

Test conditions: in the case that the initial capacity is basically the same, the number of cycle when the capacity decays to 80% of the initial value was determined under a condition of 25° C. and 0.2 C/0.2 C.

4. Battery Short-Circuit Rate Test

During the cycle life test, the failure or short-circuit of battery is characterized by the battery failing to be charged and discharged normally, which is recorded as short-circuit. Short-circuit rate of battery=number of short-circuited battery/total number of measured battery×100%.

Example 1

Example 1 provides a metal lithium negative electrode containing an interface functional layer and a lithium-ion battery, and the preparation method thereof. The method includes the following steps.

1. Preparation of the Metal Lithium Negative Electrode Containing an Interfacial Functional Layer (1) 1,4-dioxane, lithium bis(difluorosulfonyl)imide (LiTFSI), polycarbonate (PC), and nanoboron nitride (BN) were fully mixed in a mass ratio of 79:9:10:2, and then placed in a beaker and stirred evenly with a rotation speed of 300 rpm for 15 h to form a homogeneous solution.

(2) After the stirring was completed, the homogeneous solution was uniformly coated on the surface of the metal lithium sheet by means of blade coating, so that the homogeneous solution fully covered and infiltrated into the metal lithium sheet.

Figure 1:
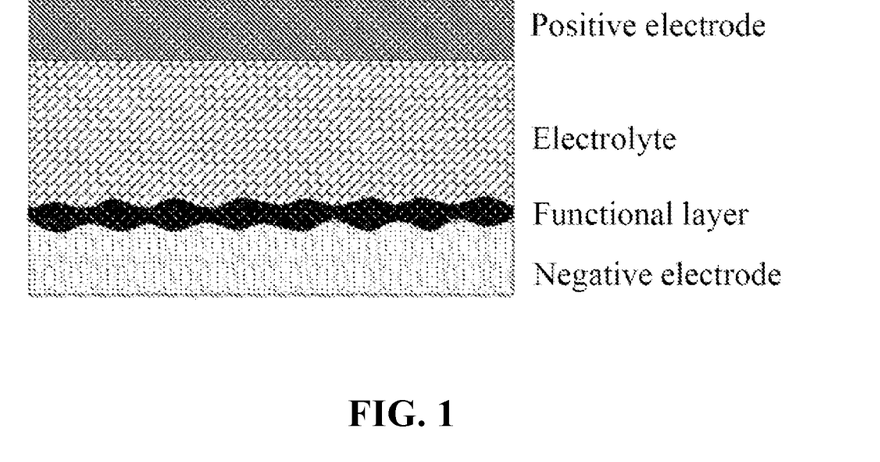
FIG. 1 is a schematic structural diagram of a metal lithium negative electrode sheet and an interface functional layer thereon according to Example 1 of the present application.

(3) After a pretreatment for 15 minutes, a heating and curing treatment was performed on the metal lithium sheet, where the curing temperature was 45° C., to obtain a metal lithium negative electrode containing an interface functional layer. As shown in FIG. 1, the interface functional layer had a thickness of 500 nm.

2. Preparation of Lithium-Ion Battery

A positive electrode sheet with an areal density of 6 mg/cm$^2$ was obtained through coating with lithium cobalt oxide (91 wt %), $Li_{6.6}La_3Zr_{1.6}Ta_{0.4}O_{12}$ solid electrolyte (3.0 wt %), acetylene black (2.5 wt %), and polytetrafluoroethylene (3.5 wt %). The prepared positive electrode sheet, the $Li_{6.6}La_3Zr_{1.6}Ta_{0.4}O_{12}$ solid electrolyte and the metal lithium negative electrode containing the interface functional layer processed as above were assembled to prepare a soft-packed lithium-ion battery by using an existing lamination process.

Comparative Example 1

Comparative Example 1 provides a lithium-ion battery, and the preparation method thereof. The method includes the following steps.

A positive electrode sheet with an areal density of 6 mg/cm$^2$ was obtained through coating with lithium cobalt oxide (91 wt %), $Li_{6.6}La_3Zr_{1.6}Ta_{0.4}O_{12}$ solid electrolyte (3.0 wt %), acetylene black (2.5 wt %), and PVDF (3.5 wt %). The prepared positive electrode sheet, $Li_{6.6}La_3Zr_{1.6}Ta_{0.4}O_{12}$ solid electrolyte and the conventional metal lithium negative electrode which was untreated were assembled to prepare a soft-packed solid lithium-ion battery by using the existing lamination process.

Example 2

Example 2 provides a metal lithium negative electrode containing an interface functional layer and a lithium-ion battery, and the preparation method thereof. The method includes the following steps.

1. Preparation of Li—In Alloy Negative Electrode Containing an Interfacial Functional Layer (1) 1,3-dioxolane, lithium hexafluoroarsenate ($LiAsF_6$), DME, and nano-alumina were fully mixed in a mass ratio of 68:12:23:3, then placed in a beaker and uniformly stirred for 8 h with a rotation speed of 600 rpm to form a homogeneous solution.

(2) After finishing stirring, the Li—In alloy was immersed in the homogeneous solution, so that the homogeneous solution fully covered and infiltrated into the Li—In alloy.

(3) After a pretreatment for 9 min, the Li—In alloy was taken out from the homogeneous solution, and heated and cured at a curing temperature of 35° C. to obtain a Li—In alloy negative electrode containing an interface functional layer, in which the interface functional layer had a thickness of 400 nm.

2. Preparation of Lithium-Ion Battery

A positive electrode sheet with an areal density of 12 $mg/cm^2$ was obtained through coating with $LiNi_{0.5}Co_{0.3}Mn_{0.2}O_2$ (74 wt %), lithium phosphorus chlorine sulfide solid electrolyte (11 wt %), Super-P (9 wt %), and PVDF-HFP (6 wt %). The prepared positive electrode sheet, the lithium phosphorus chlorine sulfide solid electrolyte and the Li—In alloy negative electrode containing the interface functional layer processed as above were assembled to prepare a lithium-ion battery by using a mold.

Comparative Example 2

Comparative Example 2 provides a lithium-ion battery, and the preparation method thereof. The method includes the following steps.

A positive electrode sheet with an areal density of 12 $mg/cm^2$ was obtained through coating with $LiNi_{0.5}Co_{0.3}Mn_{0.2}O_2$ (74 wt %), lithium phosphorus chlorine sulfide solid electrolyte (11 wt %), Super-P (9 wt %), and PVDF-HFP (6 wt %). The prepared positive electrode sheet, the lithium phosphorus chlorine sulfide solid electrolyte and the traditional Li—In alloy negative electrode were assembled to prepare a lithium-ion battery by using a mold.

Example 3

Example 3 provides a metal lithium negative electrode containing an interface functional layer and a lithium-ion battery, and the preparation method thereof. The method includes the following steps.

1. Preparation of Li—Cu Composite Negative Electrode Containing Interfacial Functional Layer (1) 1,4-dioxane, lithium trifluoromethanesulfonate ($LiCF_3SO_3$), EC/DEC with a system ratio of 1:1 were mixed uniformly in a mass ratio of 67:15:18 and placed in a beaker, and stirred uniformly with a rotation speed of 800 rpm for 2 h to form a homogeneous solution.

(2) Li—Cu composite tape was immersed in the stirred homogeneous solution, so that the homogeneous solution fully covered and infiltrated into the Li—Cu composite tape.

(3) After a pretreatment for 3 min, the Li—Cu composite tape was taken out from the homogeneous solution, and cured at a room temperature of 25° C. to obtain a Li—Cu composite negative electrode containing an interface functional layer, in which the interface functional layer had a thickness of 800 nm.

2. Preparation of Lithium-Ion Battery

A positive electrode sheet with an areal density of 10 $mg/cm^2$ was obtained through coating with lithium iron phosphate (85 wt %), polyethylene oxide polymer electrolyte (8%), CNT (5 wt %), and polyvinylidene fluoride (2 wt %). The prepared positive electrode sheet, the polyethylene oxide polymer electrolyte and the Li—Cu composite negative electrode containing an interface functional layer processed as above were assembled to obtain a soft-packed solid-state lithium-ion battery using the existing winding process.

Comparative Example 3

Comparative Example 3 provides a lithium-ion battery, and the preparation method thereof. The method includes the following steps.

A positive electrode sheet with an areal density of 10 $mg/cm^2$ was obtained through coating with lithium iron phosphate (85 wt %), polyethylene oxide polymer electrolyte (8%), CNT (5 wt %), and polyvinylidene fluoride (2 wt %). The prepared positive electrode sheet, the polyethylene oxide polymer electrolyte and Li—Cu composite negative electrode were assembled to obtain a soft-packed solid-state lithium-ion battery using the existing winding process.

Example 4

Example 4 provides a solid electrolyte containing an interface functional layer and a lithium-ion battery, and the preparation method thereof. The method includes the following steps.

1. Preparation of the Solid Electrolyte Containing an Interfacial Functional Layer (1) 1,3-dioxolane, lithium hexafluorophosphate ($LiPF_6$), PC (Propylene carbonate)/DMM (Dipropyleneglycol dimethyl ether) with a volume ratio of 1:1, and nano-BN were fully mixed in a mass ratio of 56:18:23:3 and then placed in a beaker, and stirred uniformly with a rotation speed of 500 rpm for 1 h until to form a homogeneous solution.

(2) After the stirring is completed, the homogeneous solution was uniformly coated on a surface of the $Li_{0.3}La_{0.56}TiO_3$ electrolyte that is close to the positive electrode by a way of tape casting, so that the homogeneous solution fully covered and infiltrated into the $Li_{0.3}La_{0.56}TiO_3$ electrolyte near the positive electrode.

Figure 2:
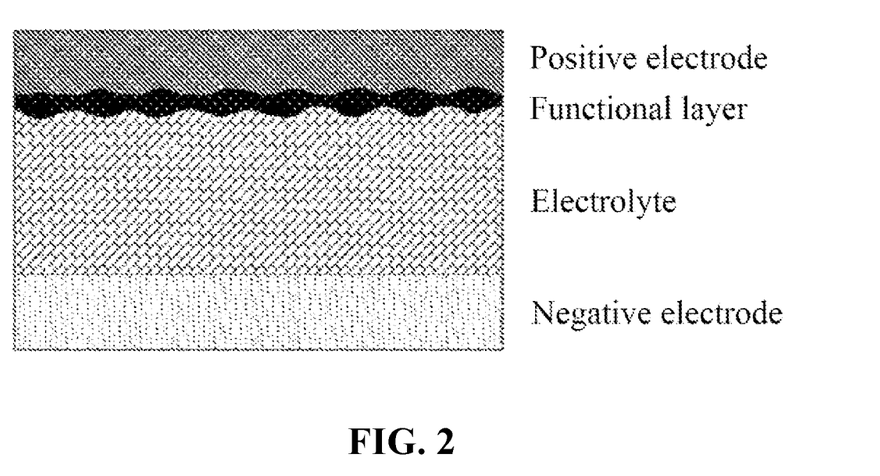
FIG. 2 is a schematic structural diagram of a solid electrolyte and an interface functional layer thereon in Example 4 of the present application.
Figure 3:
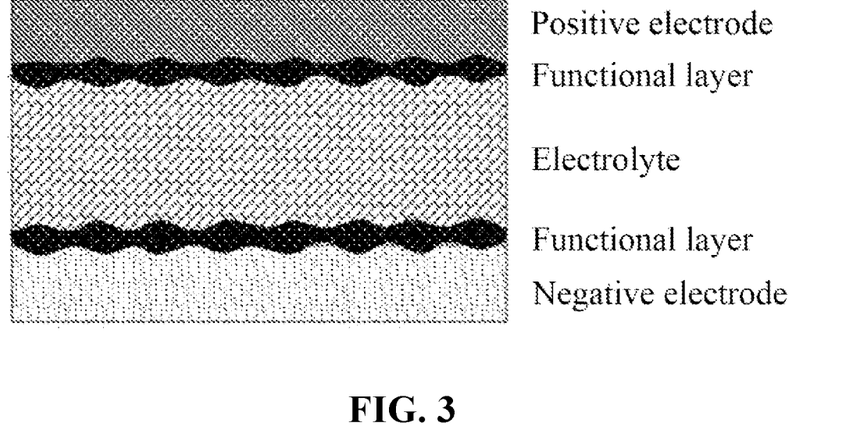
FIG. 3 is a schematic structural diagram of a solid electrolyte and an interface functional layer thereon in Example 7 of the present application.
Figure 4:
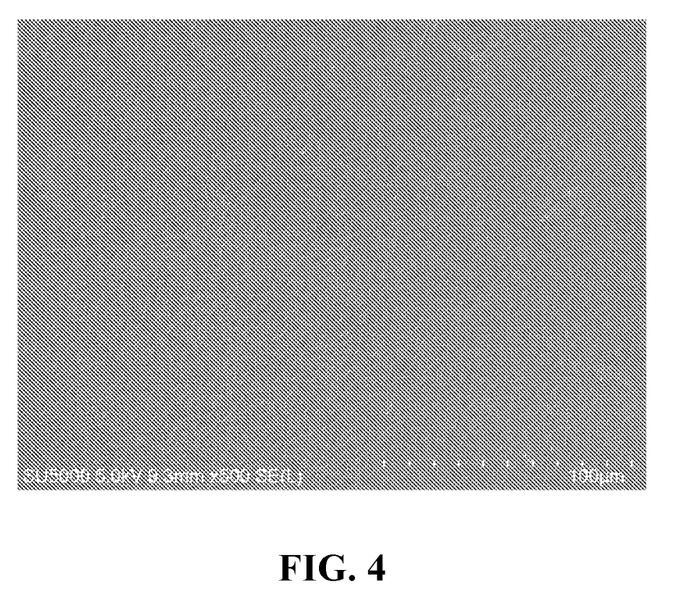
FIG. 4 is a microscopic morphology image of an interface functional layer in Example 3 of the present application.

(3) After a pretreatment for 24 min, a curing treatment was performed on the $Li_{0.3}La_{0.56}TiO_3$ electrolyte at room temperature of 55° C. to obtain the solid electrolyte containing an interface functional layer, as shown in FIG. 2, in which the thickness of the interface functional layer was 300 nm.

2. Preparation of Lithium-Ion Battery

A positive electrode sheet with an areal density of 2.5 $mg/cm^2$ was obtained through coating with $LiNi_{0.8}Co_{0.15}Al_{0.05}O_2$ (80 wt %), $Li_{0.3}La_{0.56}TiO_3$ (5%), Ketjen Black (8 wt %), and polytetrafluoroethylene (7 wt %). The prepared positive electrode sheet, the solid electrolyte containing an interface functional layer and a metal lithium sheet were assembled to obtain a button battery, in which the interface functional layer was located between the positive electrode sheet and the solid electrolyte.

Comparative Example 4

Comparative Example 4 provides a lithium-ion battery, and the preparation method thereof. The method includes the following steps.

A positive electrode sheet with an area density of 2.5 mg/cm$^2$ was obtained through coating with LiNi$_{0.8}$Co$_{0.15}$Al$_{0.05}$O$_2$ (80 wt %), Li$_{0.3}$La$_{0.56}$TiO$_3$ (5%), Ketjen Black (8 wt %), and polytetrafluoroethylene (7 wt %). The prepared positive electrode sheet, the Li$_{0.3}$La$_{0.56}$TiO$_3$ oxide inorganic electrolyte and the metal lithium sheet were assembled to obtain a button battery.

Example 5

Example 5 provides a metal lithium negative electrode solid electrolyte containing an interface functional layer and a lithium-ion battery, and the preparation method thereof. The method includes the following steps.

1. Preparation of the Solid Electrolyte Containing an Interfacial Functional Layer (1) 1,3- dioxolane, lithium difluoro(oxalate)borate (LiDFOB), EC (Ethylene carbona)/DMC (Dimethyl carbonate) with a volume ratio of 1:1 were mixed uniformly in a mass ratio of 61:18:21 and then placed in a beaker, and stirred uniformly with a rotation speed of 600 rpm for 8 h to form a homogeneous solution.

(2) After the stirring was completed, the homogeneous solution was uniformly coated on a surface of Li$_{1.5}$Al$_{0.5}$Ge$_{1.5}$(PO$_4$)$_3$(LAGP) electrolyte by means of spray coating, so that the homogeneous solution fully covered and infiltrated into the Li$_{1.5}$A$_{0.5}$Ge$_{1.5}$(PO$_4$)$_3$(LAGP) electrolyte.

(3) After a pretreatment for 12 minutes, a heating and curing treatment was performed, where the curing temperature was 45° C., to obtain a solid electrolyte containing the Li$_{1.5}$Al$_{0.5}$Ge$_{1.5}$(PO$_4$)$_3$(LAGP) interface functional layer, in which the interface functional layer had a thickness of 500 nm.

2. Preparation of Lithium-Ion Batteries

A positive electrode sheet with an areal density of 4 mg/cm$^2$ was obtained through coating with lithium manganate (LiMnO$_2$) (83 wt %), LAGP solid electrolyte (5 wt %), Ketjen black (6 wt %), and polyvinylidene fluoride (6 wt %). The prepared positive electrode sheet, the pretreated solid-state electrolyte containing Li$_{1.5}$Al$_{0.5}$Ge$_{1.5}$(PO$_4$)$_3$ interface functional layer and the metal lithium ribbon were assembled to prepare a soft-packed solid-state lithium-ion battery using the existing lamination process, in which the Li$_{1.5}$Al$_{0.5}$Ge$_{1.5}$(PO4)3 interface functional layer was located between the solid electrolyte and the metal lithium ribbon.

Comparative Example 5

Comparative Example 5 provides a lithium-ion battery, and the preparation method thereof. The method includes the following steps.

A positive electrode sheet with an areal density of 4 mg/cm$^2$ was obtained through coating with lithium manganate (LiMnO$_2$) (83 wt %), LAGP solid electrolyte (5 wt %), Ketjen black (6 wt %), and polyvinylidene fluoride (6 wt %). The prepared positive electrode sheet, traditional Li$_{1.5}$Al$_{0.5}$Ge$_{1.5}$(PO4)3 solid electrolyte and the metal lithium ribbon were assembled to prepare a soft-packed solid lithium-ion battery using the existing lamination process, in which, the Li$_{1.5}$Al$_{0.5}$Ge$_{1.5}$(PO$_4$)$_3$ interface functional layer was located between the solid electrolyte and the metal lithium ribbon.

Example 6

Example 6 provides a solid electrolyte and a lithium-ion battery containing an interface functional layer, and the preparation method thereof. The method includes the following steps.

1. Preparation of Solid Electrolyte Containing Functional Layers on its Both Sides (1) 1,3-dioxolane, LiPF6/LiTFSI with a mass ratio of 2:1, EC/DEC (Diethyl carbonate)/DME (Dimethyl ether) with a volume ratio of 1:1:1 were mixed in a mass ratio of 51:18:31, and then placed in a beaker and stirred at a rotation speed of 500 rpm for 15 h to form a homogeneous solution.

(2) Li$_{6.4}$La$_3$Zr$_{1.4}$Ta$_{0.6}$O$_{12}$ solid electrolyte sheet was immersed in the obtained homogeneous solution to ensure that the homogeneous solution fully covered and infiltrated into the Li$_{6.4}$La$_3$Zr$_{1.4}$Ta$_{0.6}$O$_{12}$ solid electrolyte sheet.

(3) After a pretreatment for 19 minutes, the Li$_{6.4}$La$_3$Zr$_{1.4}$Ta$_{0.6}$O$_{12}$ solid electrolyte sheet was taken out from the homogeneous solution and cured at 50° C. to obtain the solid electrolyte with interfacial functional layers on its both sides, in which each interfacial functional layer had a thickness of 1 μm.

2. Preparation of Lithium-Ion Battery

A positive electrode sheet with an areal density of 3 mg/cm$^2$ was obtained through coating with LiNi$_{0.6}$Co$_{0.6}$Mn$_{0.2}$O$_2$ (72 wt %), Li$_{6.4}$La$_3$Zr$_{1.4}$Ta$_{0.6}$O$_{12}$ solid electrolyte (11 wt %), Super-P (9 wt %), and PVDF-HFP (8 wt %). The prepared positive electrode sheet, Li$_{6.4}$La$_3$Zr$_{1.4}$Ta$_{0.6}$O$_{12}$ solid electrolyte containing functional layers on its both sides and a metal lithium negative electrode were assembled to prepare a button-type lithium-ion battery using the existing process.

Example 7

Example 7 provides a solid electrolyte and a lithium-ion battery, and the preparation method thereof. The method includes the following steps.

1. Preparation of Solid Electrolyte Containing Functional Layers on its Both Sides (1) 1,3-dioxolane, LiPF$_6$/LiTFSI with a mass ratio of 2:1, EC/DEC/DME with a volume ratio of 1:1:1 were mixed evenly in a mass ratio of 91:5:4, and then placed in a beaker and stirred at a rotation speed of 500 rpm for 15 h to form a homogeneous solution.

(2) Li$_{6.4}$La$_3$Zr$_{1.4}$Ta$_{0.6}$O$_{12}$ solid electrolyte sheet was immersed in the obtained homogeneous solution to ensure that the homogeneous solution fully covered and infiltrated into the Li$_{6.4}$La$_3$Zr$_{1.4}$Ta$_{0.6}$O$_{12}$ solid electrolyte sheet.

(3) After a pretreatment for 19 minutes, the Li$_{6.4}$La$_3$Zr$_{1.4}$Ta$_{0.6}$O$_{12}$ solid electrolyte sheet was taken out from the homogeneous solution and cured at 50° C. to obtain a solid electrolyte containing interfacial functional layers on its both sides, in which each interfacial functional layer had a thickness of 600 nm.

2. Preparation of Lithium-Ion Battery

A positive electrode sheet with an areal density of 3 mg/cm$^2$ was obtained through coating with LiNi$_{0.6}$Co$_{0.6}$Mn$_{0.2}$O$_2$ (72 wt %), Li$_{6.4}$La$_3$Zr$_{1.4}$Ta$_{0.6}$O$_{12}$ solid electrolyte (11 wt %), Super-P (9 wt %), and PVDF-HFP (8 wt %). The prepared positive electrode sheet, the Li$_{6.4}$La$_3$Zr$_{1.4}$Ta$_{0.6}$O$_{12}$ solid electrolyte containing functional layers on its both sides and a metal lithium negative electrode were assembled to prepare a button-type lithium-ion battery using the existing process.

Example 8

Example 8 provides a metal lithium negative electrode containing an interface functional layer and a lithium-ion battery, and the preparation method thereof. The method includes the following steps.

1. Preparation of a Metal Lithium Negative Electrode Containing an Interfacial Functional Layer (1) 1,4-dioxane, $LiPF_6$/LiFSI with a mass ratio of 1:1, DME, and nano-silica were mixed evenly in a mass ratio of 81:28:50:3 and placed in a beaker, stirred uniformly with a rotation speed of 1000 rpm for 1 h to form a homogeneous solution.

(2) A lithium ribbon containing a Cu current collector was immersed in the stirred homogeneous solution, so that the homogeneous solution fully covered and infiltrated into the lithium ribbon.

(3) After a pretreatment for 6 min, the lithium ribbon was taken out from the homogeneous solution, and cured at a room temperature to obtain the metal lithium negative electrode containing an interface functional layer, in which the interface functional layer had a thickness of 500 nm.

2. Preparation of Lithium-Ion Battery

A positive electrode sheet with an areal density of 15 mg/cm$^2$ was obtained through coating with lithium nickelate ($Li_2NiO_2$) (80 wt %), polyester polymer electrolyte (12 wt %), conductive carbon black (3 wt %), graphene (2 wt %), and polyvinylidene fluoride (3 wt %). The prepared positive electrode sheet, was stacked with the polymer electrolyte and a treated Cu current collector lithium ribbon containing a functional layer in sequence, and subjected to the existing winding process, to prepare a soft-packed lithium-ion battery.

Figure 6:
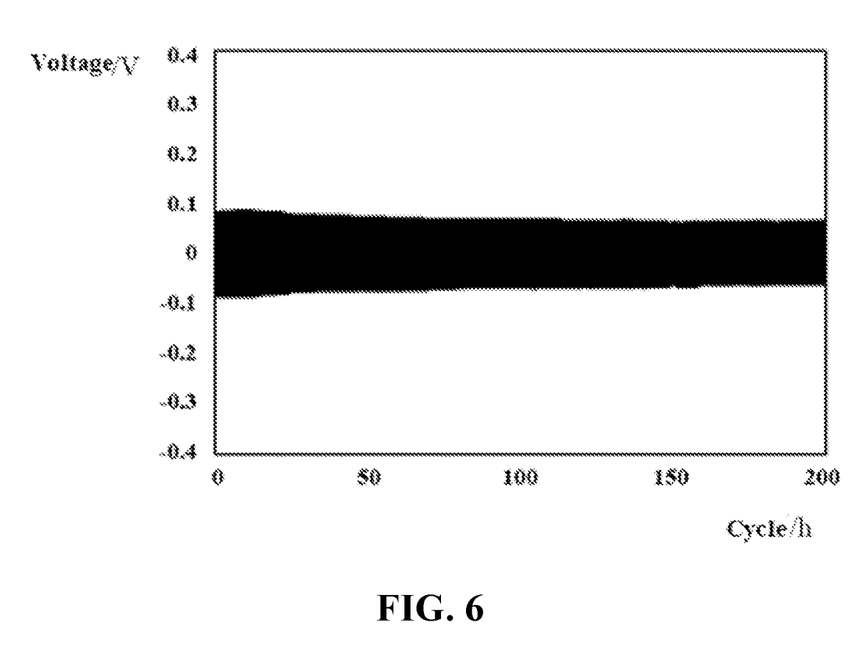
FIG. 6 is a cycle diagram of the symmetric lithium battery at a current density of 1 mA/cm$^2$ in Example 8 of the present application.

The metal lithium negative electrode containing the interface functional layer in Example 8 was assembled into a symmetric lithium battery, and a cycle test was performed on the symmetric lithium battery, the results as shown in FIG. 6.

Comparative Example 6

Comparative Example 6 provides a metal lithium negative electrode and a lithium-ion battery. The difference between Comparative Example 6 and Example 8 only lies in that 1,4-dioxane, $LiPF_6$/LiFSI (mass ratio 1:1), DME and nano-silica has a mass ratio of 45:4:6:13 in Comparative Example 6, with other preparation methods and parameters being the same.

Comparative Example 7

Comparative Example 7 provides a metal lithium negative electrode and a lithium-ion battery. The difference between Comparative Example 7 and Example 8 only lies in that 1,4-dioxane, $LiPF_6$/LiFSI (mass ratio 1:1), DME and nano-silica has a mass ratio of 30:5:20:13 in Comparative Example 7, with other preparation methods and parameters being the same.

Comparative Example 8

Comparative Example 8 provides a metal lithium negative electrode and a lithium-ion battery. The difference between Comparative Example 8 and Example 8 only lies in that the 1,4-dioxane, $LiPF_6$/LiFSI (mass ratio 1:1), DME and nano-silica has a mass ratio of 20:10:8:8 in Comparative Example 8, with other preparation methods and parameters being the same.

The AC impedance, cycle life, Coulomb efficiency and battery short-circuit rate of the lithium-ion batteries in Examples 1-8 and Comparative Examples 1-8 of this application were respectively tested at room temperature. The results are shown in Table 1.

TABLE 1

|  | AC impedance ($\Omega$) at room temperature | Cycle life/cycle (0.2 C/0.2 C) | Coulomb efficiency (%) | Battery short-circuit rate (%) |
| --- | --- | --- | --- | --- |
| Example 1 | 62 | 353 | 92.83% | 0 |
| Comparative Example 1 | 354 | 55 | 85.17% | 0.4 |
| Example 2 | 103 | 243 | 89.86% | 0 |
| Comparative Example 2 | 321 | 132 | 83.93% | 1.1 |
| Example 3 | 85 | 295 | 91.27% | 0 |
| Comparative Example 3 | 203 | 104 | 88.42% | 0 |
| Example 4 | 66 | 382 | 94.57% | 0 |
| Comparative Example 4 | 538 | 149 | 82.93% | 0.8 |
| Example 5 | 103 | 246 | 90.52% | 0 |
| Comparative Example 5 | 686 | 165 | 80.31% | 2.3 |
| Example 6 | 95 | 175 | 92.33% | 0 |
| Example 7 | 110 | 412 | 90.84% | 0 |
| Example 8 | 82 | 260 | 91.10% | 0 |
| Comparative Example 6 | 332 | 121 | 88.43% | 0.6 |
| Comparative Example 7 | 549 | 62 | 88.32% | 0.5 |
| Comparative Example 8 | 522 | 47 | 85.64% | 0.3 |

As shown in Table 1, it can be seen from the comparison of the examples and the comparative examples that since an interface functional layer is provided between the positive electrode and the solid electrolyte and/or between the negative electrode and the solid electrolyte, the lithium-ion battery of this application has a lower interface impedance, and a higher cycle efficiency and cycle stability, and meanwhile has a battery short-circuit rate that is almost zero.

Figure 5:
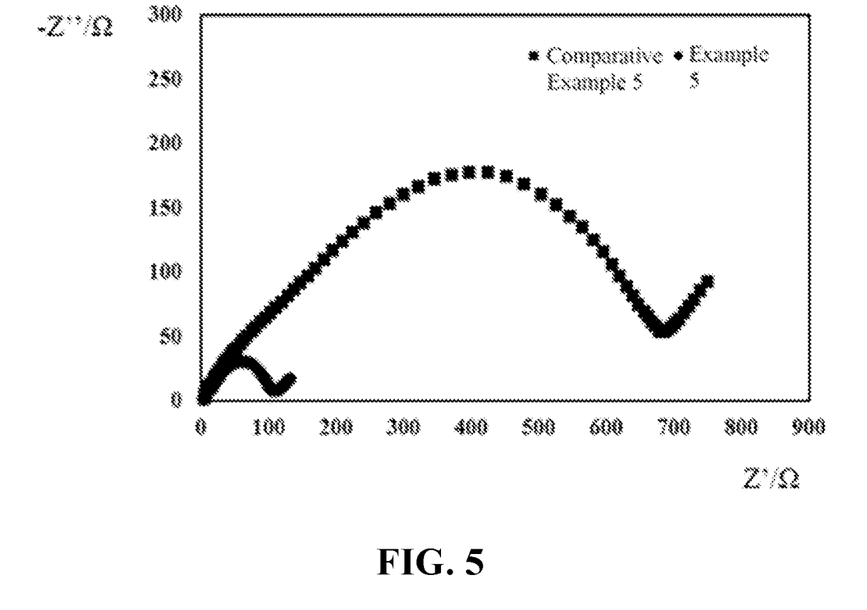
FIG. 5 is a schematic diagram showing a comparison between AC impedance of the lithium-ion battery in Example 5 and AC impedance of the lithium-ion battery in Comparative Example 5 of the present application.

As shown in FIG. 5, compared with Comparative Example 5, the AC impedance at room temperature is smaller in Example 5, indicating that the battery in Example 5 has excellent interface performance and excellent overall performance.

As shown in FIG. 6, the symmetric lithium battery in Example 8 shows good stability in the voltage platform within 200 cycles without short circuit. It shows that there is good interface stability between the electrolyte and the negative electrode sheet that is prepared in Example 8 of this application, such that the growth of lithium dendrites can be well inhibited.

To sum up, by adjusting a composition and proportion of raw materials in the interface functional layer of this application, a grain boundary resistance and electrode interface performance can be improved, and the uneven deposition of lithium-ions at interface gaps can be inhibited, the interface impedance can be induced, and meanwhile the interface stability can be improved. The above-mentioned interface functional layer can be used for preparing a lithium-ion battery, such that the uneven deposition of lithium-ions at the interface gaps is inhibited, the interface impedance is reduced, and meanwhile the interface stability is improved. The lithium-ion battery of this application has higher cycle efficiency and cycle stability, with the battery short-circuit rate being almost zero.

The above description summarizes the features of several examples, which enables those skilled in the art to better understand various aspects of the application. Those skilled in the art can readily use this application as a basis for designing or modifying other compositions, so as to realize the same purposes and/or achieving the same advantages as those of the embodiments disclosed herein. Those skilled in the art can also understand that these equivalent examples do not deviate from the spirit and scope of the present application, and they can make various alterations, substitutions and modifications to the present application without departing from the spirit and scope of the present application. Although the methods disclosed herein have been described with reference to specific operations performed in a specific order, it should be understood that these operations may be combined, subdivided, or reordered to form equivalent methods without departing from the teachings of this application. Accordingly, unless specifically indicated herein, the order and grouping of operations are not limitations for this application.

The embodiments of this application have been described above. However, this application is not limited to the above-described embodiments. Any modification, equivalent replacement, improvement, etc. made within the spirit and principle of this application shall be included within the protection scope of this application.

What is claimed is:

1. A preparation method of an interface functional layer for a lithium-ion battery, wherein the interface functional layer comprises a cyclic ether compound, a lithium salt, an auxiliary agent and a ceramic powder in a mass ratio of (50-90): (5-30): (5-40): (0-5); the preparation method comprises the following steps:

mixing the cyclic ether compound, the lithium salt, the auxiliary agent and the ceramic powder evenly to obtain a mixed solution, attaching the mixed solution to a positive electrode, a negative electrode and/or a solid electrolyte, and performing a curing treatment to obtain the interface functional layer;

wherein the mixing is performed under stirring, the stirring having a speed of 200-1000 rpm/min.

2. The preparation method of the interface functional layer according to claim 1, wherein the negative electrode is selected from at least one of a metal lithium negative electrode or a lithium alloy negative electrode, and the metal lithium is selected from one of molten metal lithium, lithium powder and lithium ribbon, and the lithium alloy is selected from one of Li-In alloy, Li-Al alloy, Li-Sn alloy, Li-Mg alloy and Li-Ge alloy.

3. The preparation method of the interface functional layer according to claim 1, wherein the stirring is performed for 1-24h.

4. The preparation method of the interface functional layer according to claim 1, wherein the attaching is performed by selecting from one or more of blade coating, spray coating, tape casting and soaking.

5. The preparation method of the interface functional layer according to claim 1, wherein a temperature of the curing treatment is 25-60° C.

* * * * *